United States Patent [19]
Miller

[11] Patent Number: 5,563,351
[45] Date of Patent: Oct. 8, 1996

[54] METHOD AND APPARATUS FOR DETERMINING PUMP WEAR

[75] Inventor: Dean E. Miller, East Peoria, Ill.

[73] Assignee: Caterpillar Inc., Peoria, Ill.

[21] Appl. No.: 221,143

[22] Filed: Mar. 31, 1994

[51] Int. Cl.⁶ ..................................... G01F 1/34
[52] U.S. Cl. ........................................ 73/861.42
[58] Field of Search ................. 73/7, 168, 195, 73/861.42, 861.59, 861.63; 364/510

[56] References Cited

U.S. PATENT DOCUMENTS

| | | | |
|---|---|---|---|
| 3,927,563 | 12/1975 | Konomi | 73/861.59 |
| 4,515,022 | 5/1985 | Brand | 73/861.79 |
| 4,821,580 | 4/1989 | Jorritsma | 73/861.42 X |
| 4,918,426 | 4/1990 | Butts et al. | 73/861.63 X |
| 4,945,491 | 7/1990 | Rishel | 73/195 X |

Primary Examiner—Richard Chilcot
Assistant Examiner—Elizabeth L. Dougherty
Attorney, Agent, or Firm—Steven R. Janda; Thomas J. Bluth; James R. Yee

[57] ABSTRACT

An apparatus is provided for detecting wear in a pump. The apparatus includes a case drain connected to the pump case, a flow sensor for producing signals indicative of case drain flow, a processor for determining whether pump wear has exceeded a predetermined level and for indicating a fault in response to the pump wear exceeding the predetermined level.

6 Claims, 5 Drawing Sheets

Fig_2_

Fig_4_

METHOD AND APPARATUS FOR DETERMINING PUMP WEAR

TECHNICAL FIELD

This invention relates generally to an apparatus and method for indicating pump efficiency, and more particularly, to indicating a fault in response to efficiency losses in a pump.

BACKGROUND ART

Many work machines include hydraulic systems for running motors or extending and retracting cylinders. These hydraulic systems include pumps having rotating groups that wear over time and eventually fail. If the failure of a pump is catastrophic, substantial debris can be introduced into the hydraulic system causing damage to other components. If, however, an impending failure is predicted or sensed prior to catastrophic failure, the pump can be replaced before damage to other components is caused. The repair can also be scheduled at the most opportune time to reduce productivity losses during repair.

An exemplary rotating group is illustrated in FIG. 1. The rotating group shown is in an axial piston type pump having an external case drain. As a pump begins to wear, volumetric inefficiencies increase. These inefficiencies are typified by fluid leaks around the face of the slipper, the ball socket, the piston wall, the port plate barrel interface, and the displacement control device. The leaking fluid then exits the case through the external case drain. By sensing the flow of fluid through the case drain, an indication of the extent of leakage can be obtained. This information can then be used to estimate remaining pump life.

Many conventional flow meters, such as turbine or paddle wheel flow sensors, may cause substantial back pressure. This back pressure on the pump case causes a pressure differential between the outlet and inlet which tends to pull the slipper away from the piston. In addition, shaft seals can be damaged by excess back pressure. Furthermore, pump displacement controls designed to drain to the case can suffer deleterious effects from high back pressure. Thus flow sensors with significant back pressure would cause a premature destruction of the pump or difficulty in pump displacement control.

Without any method or apparatus for sensing the increasing inefficiencies as component wear progresses, impending failures cannot be easily predicted and thus the likelihood of catastrophic failures causing damage to other components increases substantially. Likewise, repairs cannot be scheduled for the most opportune time to reduce losses of productivity during repair. Similarly, the increased leakage leads to increased fuel consumption and decreased productivity which may not be otherwise detected.

The present invention is directed to overcoming one or more of the problems set forth above.

DISCLOSURE OF THE INVENTION

The invention provides a system for indicating the extent of pump wear in response to efficiency losses. This information is then used for purposes of scheduling repairs prior to catastrophic failure and scheduling repairs at the most opportune times that will not interfere with machine productivity.

In one aspect of the invention, an apparatus is provided for detecting wear in a pump. The apparatus includes a case drain connected to the pump case, a flow sensor for producing signals indicative of case drain flow, a processor for determining whether pump wear has exceeded a predetermined level and for indicating a fault in response to the pump wear exceeding the predetermined level.

In another aspect of the invention, a method is provided for determining the wear of a pump having a case drain and includes the steps of measuring the flow of fluid in the case drain, comparing the flow to a predetermined constant, and indicating a fault in response to the flow exceeding the predetermined constant.

The invention also includes other features and advantages which will become apparent from a more detailed study of the drawings and specification.

BRIEF DESCRIPTION OF THE DRAWINGS

For a better understanding of the invention, reference may be made to the accompanying drawings, in which.

BEST MODE FOR CARRYING OUT THE INVENTION

Figure 1:
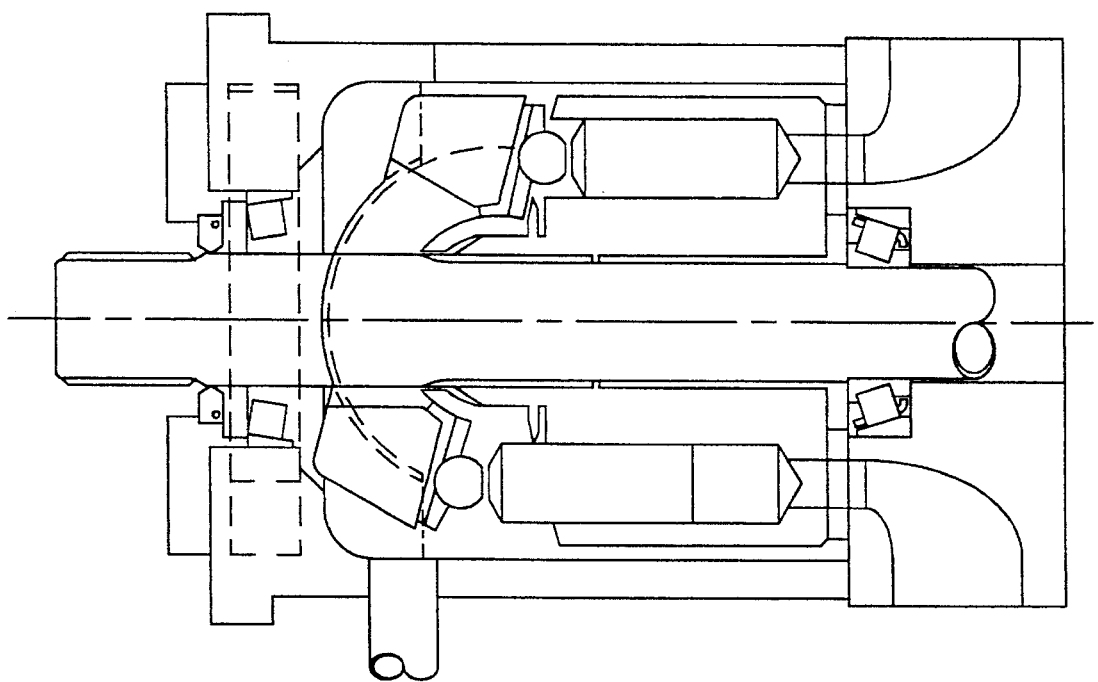
FIG. 1 is an illustration of an axial piston pump having a case drain.
Figure 2:
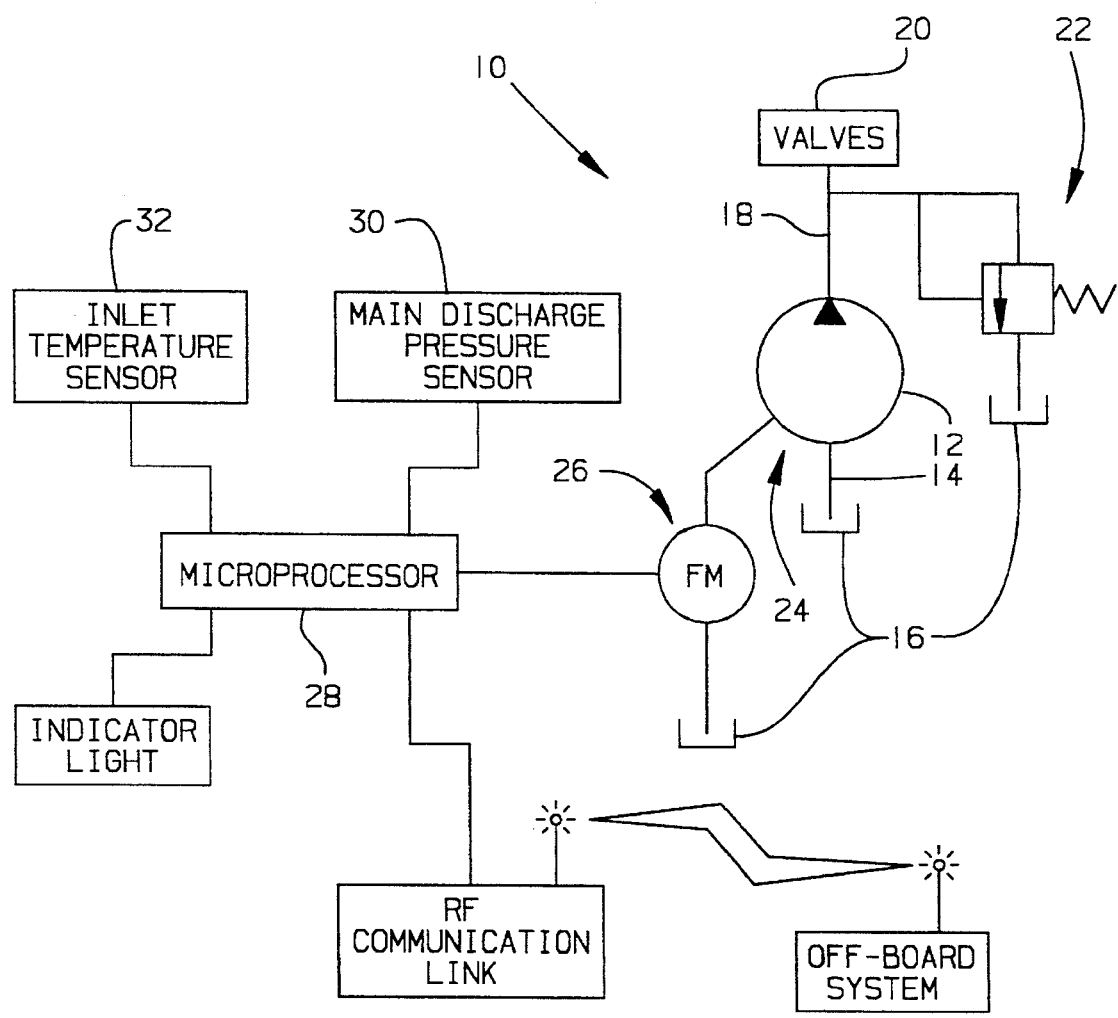
FIG. 2 is a diagrammatic illustration of an embodiment of the invention.

Referring to FIG. 2, a hydraulic system for use in a work machine is indicated generally by the reference 10. A hydraulic pump 12 has an inlet line 14 connected to a hydraulic tank 16 and a main discharge line 18 connected to a group of valves 20 which direct pressurized hydraulic fluid to the implements selected by an operator. The main discharge line 18 is also advantageously connected to a relief valve 22. An external case drain 24 provides a conduit for fluid to flow from the pump case to the hydraulic tank 16. As explained in connection with FIG. 1, flow through the case drain 24 increases as the pump wears. At some threshold level, the pump is considered worn out and replacement should proceed at the next available servicing. Similarly, if the magnitude of flow is increasing at a substantial rate, this could indicate an impending catastrophic failure. A flow meter 26 is connected in the case drain line.

The flow meter 26 includes one or more devices for producing electrical signals indicative of the magnitude of flow in the case drain 24. In the preferred embodiment, the electrical signals from the flow meter 26 are delivered to a microprocessor 28 along with signals from a discharge pressure sensor 30 and an inlet temperature sensor 32.

Figure 3:
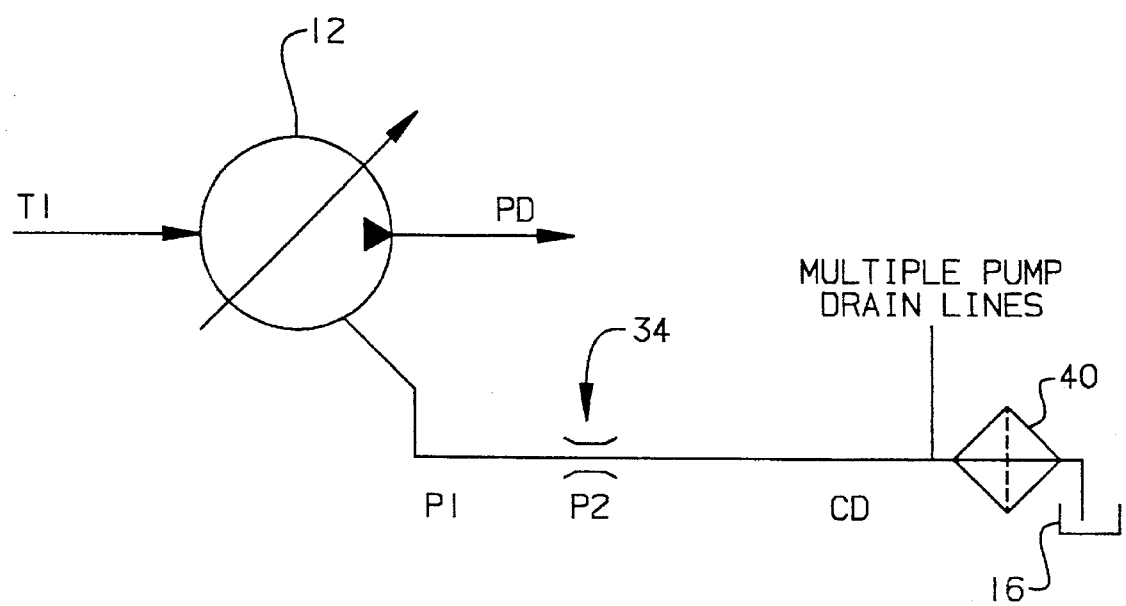
FIG. 3 is a diagrammatic illustration of an embodiment of the invention.
Figure 4:
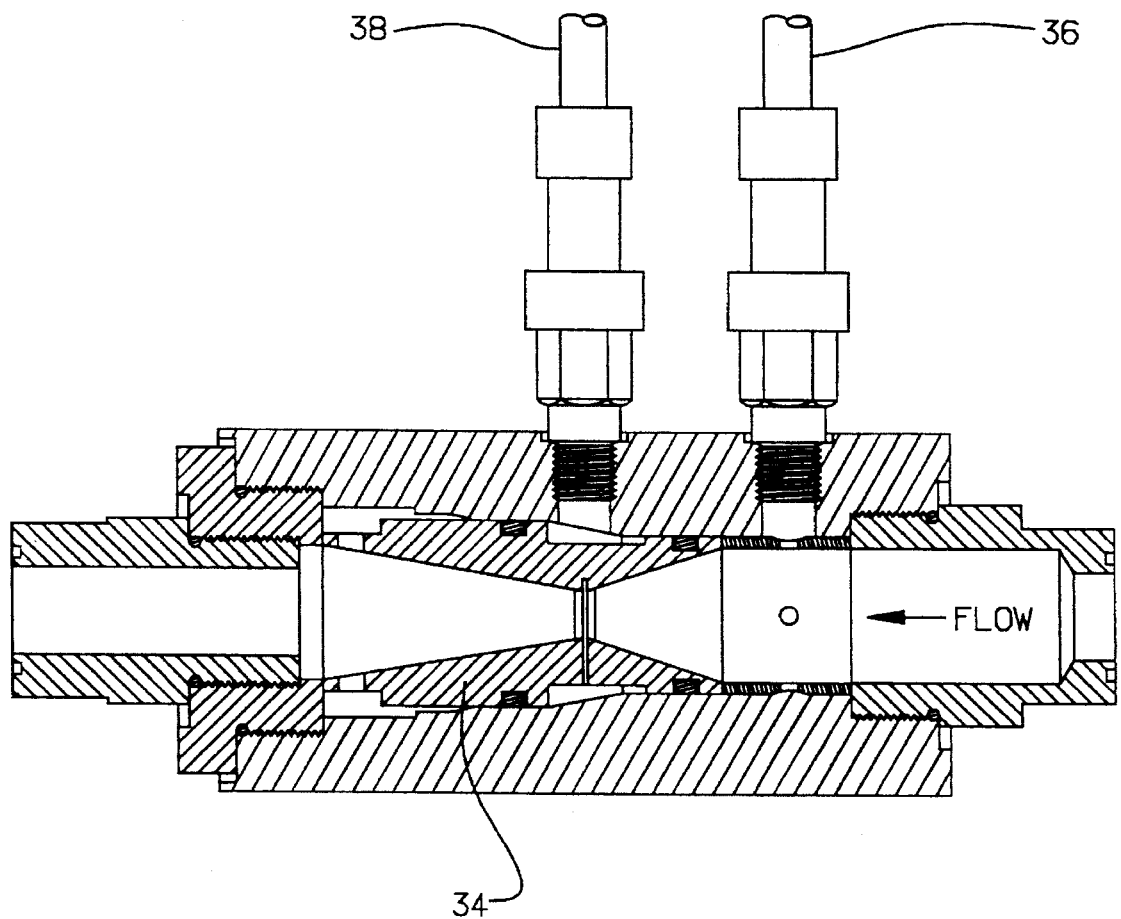
FIG. 4 is an illustration of the venturi and pressure sensor arrangement.

Turning now to FIGS. 3 and 4, the location of the various sensors are shown. The inlet temperature sensor 32 is shown by the designation T1 and the main discharge pressure sensor 30 is indicated by the designation PD. The flow meter 26 advantageously includes a venturi 34 and a pair of venturi pressure sensors 36,38 indicated by the designations P1 and P2. In the preferred embodiment, the main discharge pressure sensor 30 and the venturi pressure sensors 36,38 are pulse-width modulated pressure sensors of a type well-known in the art producing signals having duty cycles proportional to sensed pressure levels. It should be understood that the pair of venturi pressure sensors 36,38 can be replaced by a single differential pressure signal measuring the pressure drop in the venturi 34. However, by using two venturi pressure sensors 36,38, an indication of case drain pressure is also provided.

The fluid from the case drain 24 flows from the venturi 34 to a contamination indicator identified by the designation CD and is combined with fluid from other pump case drains before flowing back to the hydraulic tank 16 via a filter 40.

It should be understood that signals from the discharge pressure sensor 30 and inlet temperature sensor 32 may also be used in performing other functions. For example, the inlet temperature sensor signal indicates oil temperature; and the discharge pressure signal can be used by an electronic pump control.

Figure 5:
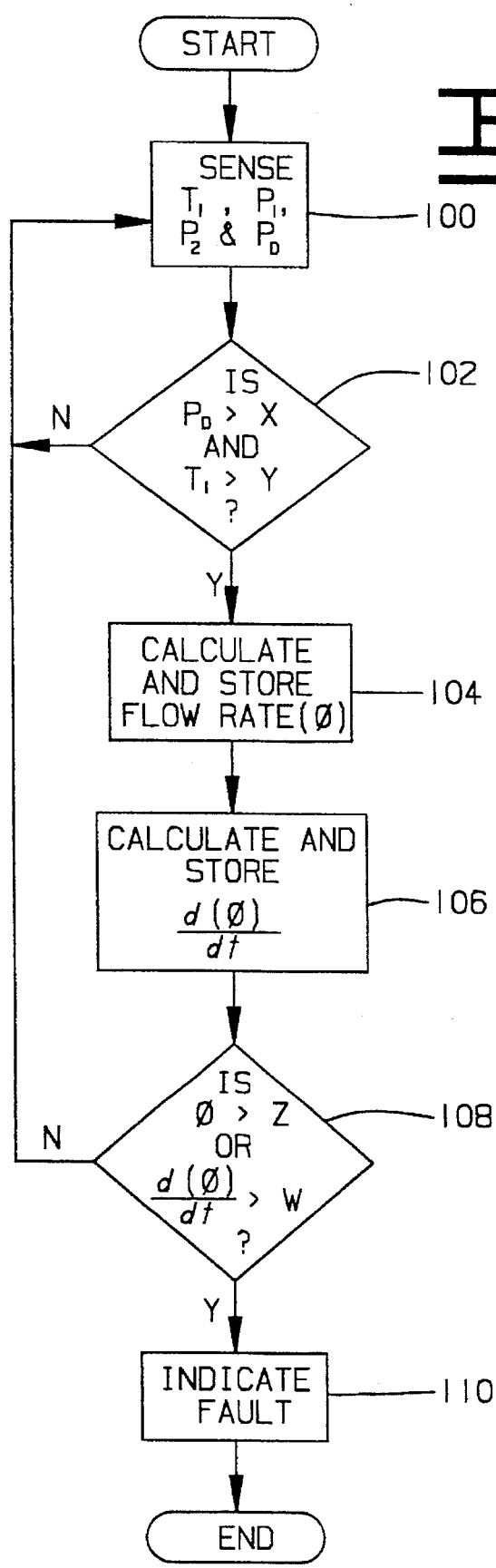
FIG. 5 illustrates a flow chart of an algorithm used in connection with an embodiment of the invention.

Turning now to FIG. 5, a flow chart of an algorithm used in connection with an embodiment of the invention is illustrated. The microprocessor 28 receives signals 100 from the main discharge pressure sensor 30, the inlet temperature sensor 32, and the venturi pressure sensors 36,38.

The microprocessor 28 compares the main discharge pressure and the inlet temperature to respective constants at block 102. If the main discharge pressure and inlet temperatures exceed their respective constants, control is passed to block 104. The constants are selected to indicate the standard operating state of the pump. Thus data for which warnings are to be produced are only examined while the pump is in a predefined operating state. This ensures that the sensed data is comparable. For example, when the hydraulic system is first activated, the flows measured in the case drain may not be truly comparable to flows sensed when the pump is in the standard operating state. It should be understood that maximum values could also be used so that case drain flows are disregarded when discharge pressure or inlet temperature is too high.

If the pump is in the standard operating state, the flow rate of fluid in the case drain 24 is calculated 104 in response to the signals from the venturi pressure sensors 36,38 in a manner well-known in the art of fluid dynamics. The calculated flow rates are stored in a memory device (not shown) associated with the microprocessor 28. The stored flow rates are then used to derive a best-fit equation using a standard regression technique such as least-squares. The best-fit equation is used to calculate the rate of change in the magnitude of case drain flow at block 106. The rate of change is also stored in memory.

If either the flow or the rate of change of flow exceed respective constants, the microprocessor 28 produces an electrical signal to indicate a fault at block 110. As set forth above, the constants are selected to identify the degree of acceptable wear and to predict impending failure. The precise values are selected by the system designer based on empirical test data relating to case drain flow versus pump wear. The values are selected to indicate a fault when the desired amount of wear is achieved and to indicate impending catastrophic failures. If the thresholds are too low, then the pump will be replaced or repaired when it still has a substantial useful life; however, if the thresholds are too high, then there is an increased risk of catastrophic failure.

The fault indication is stored as a flag indicating that the pump is becoming excessively worn. In addition, an indicator light (not shown) is illuminated in the operator compartment in a manner well-known in the art. For example, a light may be illuminated including the message "service hydraulic system soon." The stored flag may also be accessed by a service tool of a type well-known in the art for downloading service and diagnostic information. Similarly, the flag may be sent to a remote location via a RF communication link known in the art.

Industrial Applicability

In operation, the present invention is used on a work machine having hydraulically operated implements to predict impending failure of the hydraulic pump. The sensed data is used to predict an impending failure to allow replacement of the pump before damage to other components is caused. The repair can also be scheduled at the most opportune time to reduce productivity losses during repair.

The pressure sensors associated with the venturi produce signals used to calculate the flow of hydraulic fluid through the case drain. The level of fluid flow and its rate of change are then used by a processor to produce a fault indication if a failure is expected or the pump is becoming excessively worn. The fault indication may take the form of illuminating a warning light in the operator compartment instructing the operator to have the hydraulic system serviced soon. Likewise, the fault indication may be a flag being stored in the processor to indicate the existence of a problem with the hydraulic pump. The flag could then be accessed by a service tool being connected to the processor when the machine is undergoing routine service. Alternatively, the flag could be transmitted to a remote location via a radio link to indicate the impending failure to management or service personnel.

Other aspects, objects, and advantages of this invention can be obtained from a study of the drawings, the disclosure, and the appended claims.

I claim:

1. An apparatus for detecting wear in a pump having a case, comprising:

a case drain connected to the pump case;

a flow sensor connected to said case drain, said flow sensor producing pressure signals indicative of case drain flow;

means for calculating a flow rate in response to said pressure signals;

means for calculating a rate of change of said flow rate;

memory means for storing said flow rate and said rate of change of said flow rate;

means for comparing said rate of change of said of said flow rate to a predetermined constant; and means for indicating a fault in response to said rate of change of said flow rate exceeding said predetermined constant.

2. An apparatus for detecting wear in a pump having a case, comprising:

a case drain connected to the pump case;

a flow sensor connected to said case drain, said flow sensor producing pressure signals indicative of case drain flow;

means for calculating a flow rate in response to said pressure signals;

means for calculating a rate of change of said flow rate;

means for comparing said rate of change to a second predetermined constant; and means for indicating a fault in response to said rate of change exceeding said second predetermined constant.

3. An apparatus, as set forth in claim 1 wherein said flow sensor includes a venturi.

4. A method for determining the wear of a pump having a case drain, comprising the steps of:

measuring the flow of fluid in the case drain;

calculating a rate of change of said flow rate;

comparing the rate of change of said flow rate to a predetermined constant; and indicating a fault in response to the rate of change of said flow exceeding the predetermined constant.

5. A method, a set forth in claim 4, wherein said step of comparing the rate of change of said flow rate to a predetermined constant is performed in response to the pump being in a predefined operating state.

6. A method for determining the wear of a pump having a case drain, comprising the steps of:

measuring the flow of fluid in the case drain;

comparing the flow rate to a predetermined constant;

indicating a fault in response to the flow exceeding the predetermined constant;

calculating a rate of change of said flow rate;

comparing said rate of change to a second predetermined constant; and indicating a fault in response to said rate of change exceeding said second predetermined constant.

* * * * *